(No Model.) 6 Sheets—Sheet 1.
H. C. STILWELL.
CASH REGISTER AND INDICATOR.
No. 462,104. Patented Oct. 27, 1891.
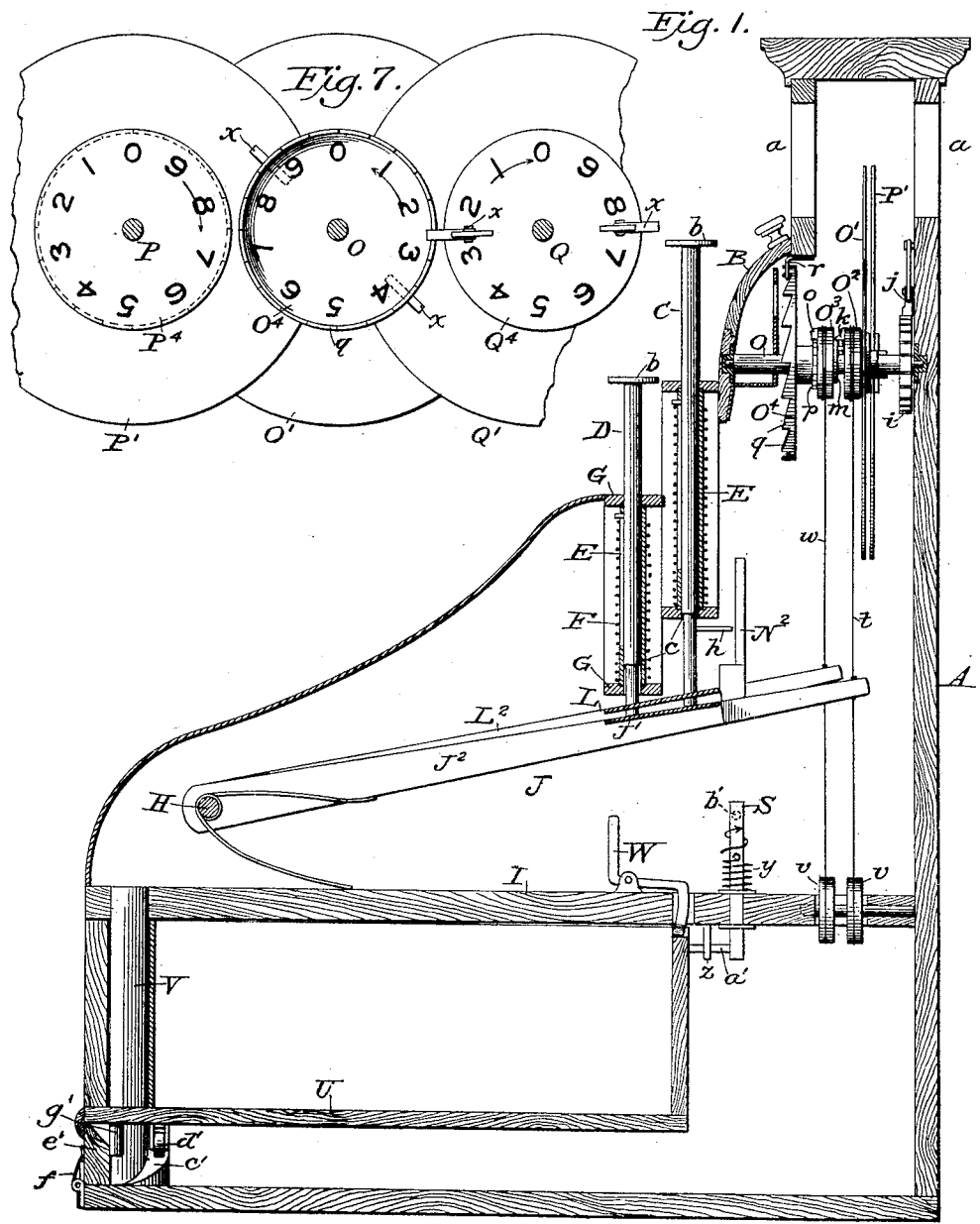
Witnesses:
James F. Duhamel
Horace A. Dodge
Inventor:
Henry C. Stilwell,
by Dodge Sons
Attys.

(No Model.) 6 Sheets—Sheet 2.

H. C. STILWELL.
CASH REGISTER AND INDICATOR.

No. 462,104. Patented Oct. 27, 1891.

Witnesses:
James F. Duhamel
Horace A. Dodge

Inventor:
H. C. Stilwell,
by Dodge Sons,
Attys.

(No Model.) 6 Sheets—Sheet 3.
H. C. STILWELL.
CASH REGISTER AND INDICATOR.

No. 462,104. Patented Oct. 27, 1891.

Witnesses:
James F. Duhamel
Horace A. Dodge

Inventor:
Henry C. Stilwell
by Dodge Sons,
Attys.

(No Model.) 6 Sheets—Sheet 4.
H. C. STILWELL.
CASH REGISTER AND INDICATOR.

No. 462,104. Patented Oct. 27, 1891.

Witnesses:
James F. Duhamel
Horace A. Dodge.

Inventor:
Henry C. Stilwell,
by Dodge Sons
Atty.

(No Model.)  6 Sheets—Sheet 5.

H. C. STILWELL.
CASH REGISTER AND INDICATOR.

No. 462,104.  Patented Oct. 27, 1891.

Witnesses:
James F. Duhamel
Horace A. Dodge

Inventor:
Henry C. Stilwell
by Dodge & Sons
Attys.

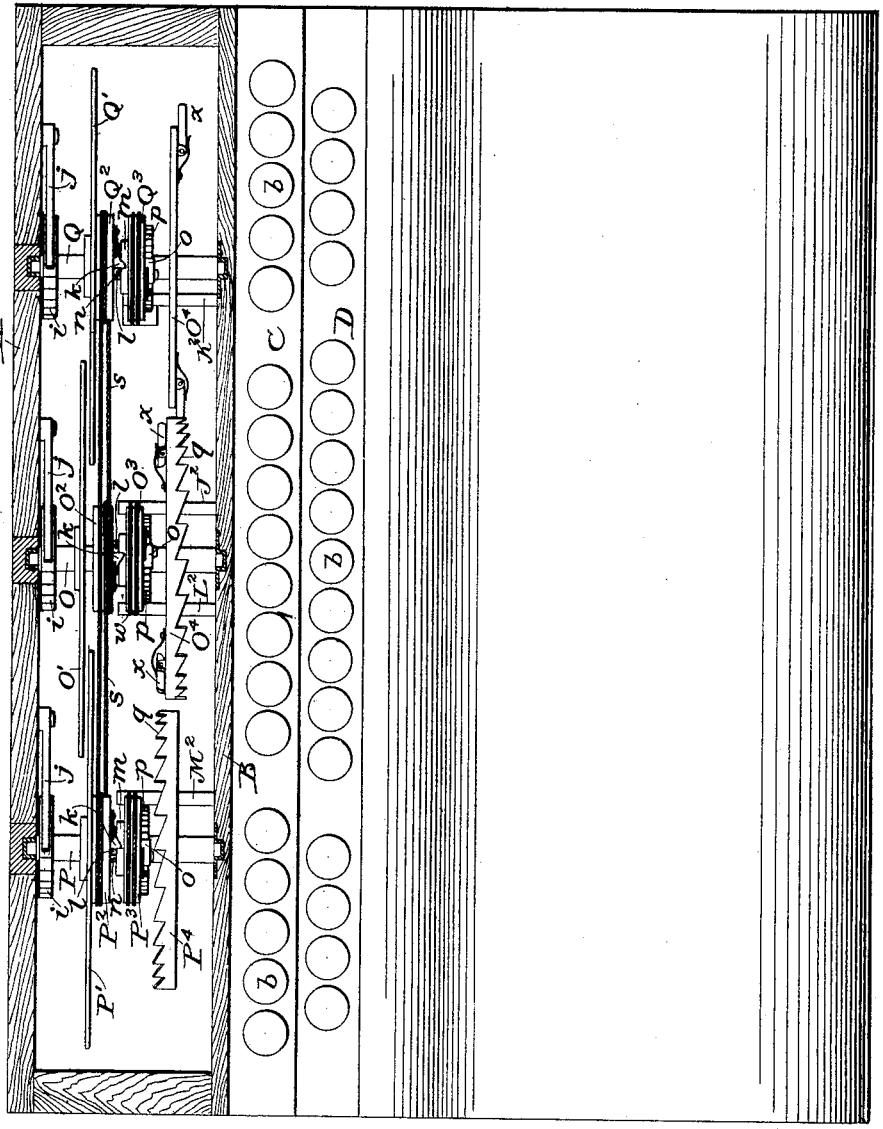

United States Patent Office.

HENRY C. STILWELL, OF DAYTON, OHIO.

CASH REGISTER AND INDICATOR.

SPECIFICATION forming part of Letters Patent No. 462,104, dated October 27, 1891.

Application filed December 1, 1890. Serial No. 373,213. (No model.)

*To all whom it may concern:*

Be it known that I, HENRY C. STILWELL, a citizen of the United States, residing at Dayton, in the county of Montgomery and State of Ohio, have invented certain new and useful Improvements in Cash Registers and Recorders, of which the following is a specification.

My invention relates to that class of machines or devices commonly known as "cash-registers," and also frequently called "cash-indicators," which are designed to indicate the amount of money received for each purchase and to register the sum or aggregate of all the purchases occurring within a given period.

The invention consists in various novel features, details, and combinations hereinafter set forth, by which the machine is rendered simple, cheap, and durable in construction and efficient in operation, and whereby, among other novel results, the operator is enabled to indicate the amount of money received from any one purchaser, even though said amount be the sum or aggregate of two or more separate items.

Figure 4:
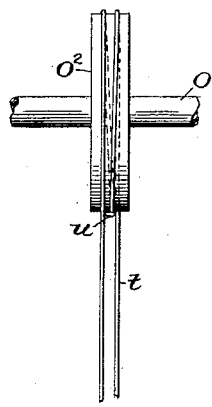
Figure 2:
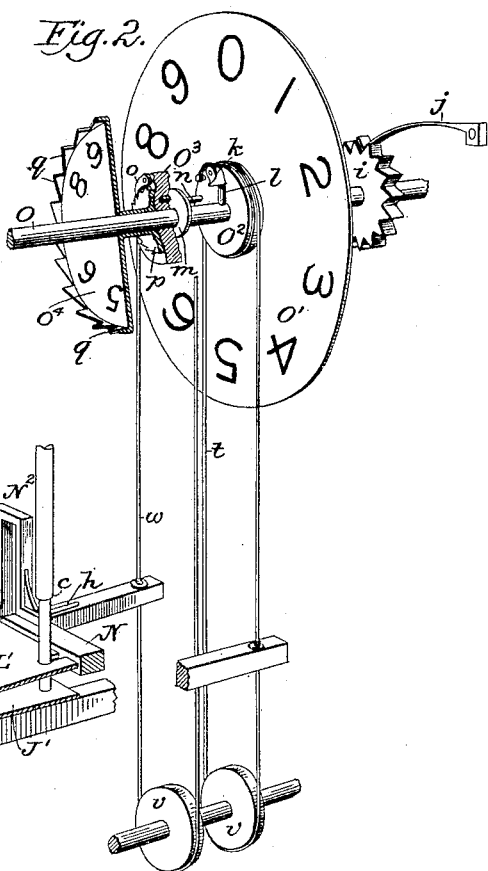
Figure 3:
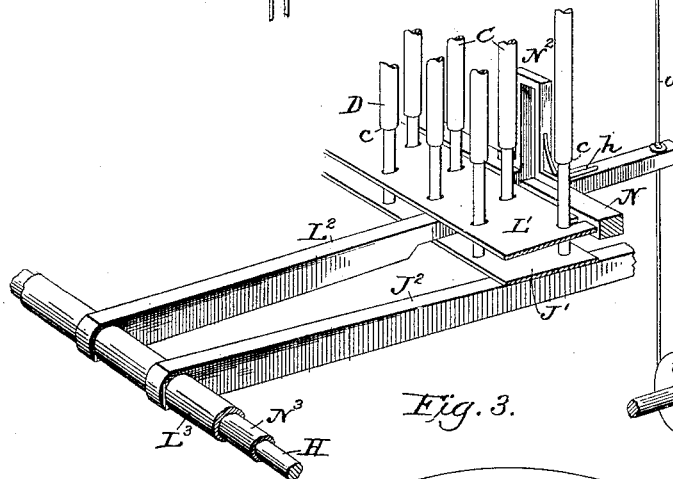
Figure 5:
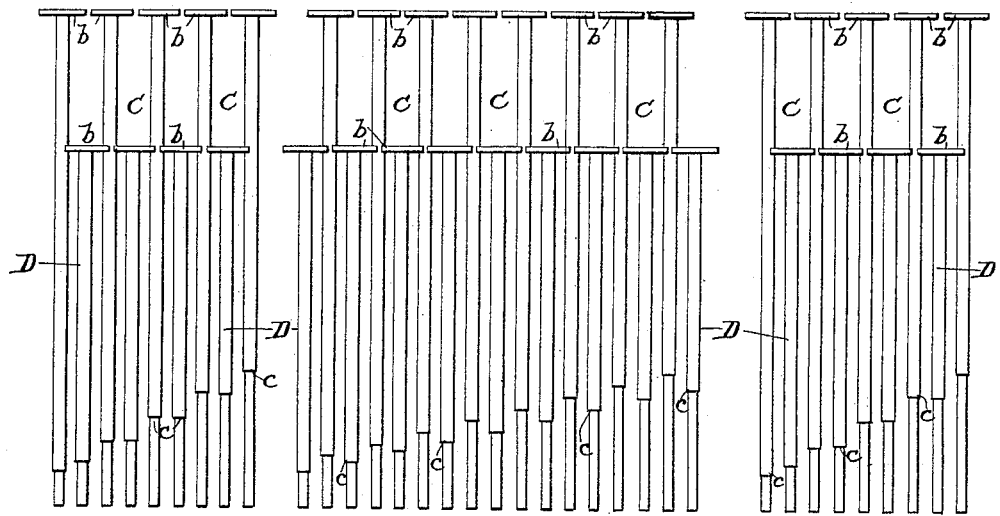
Figure 6:
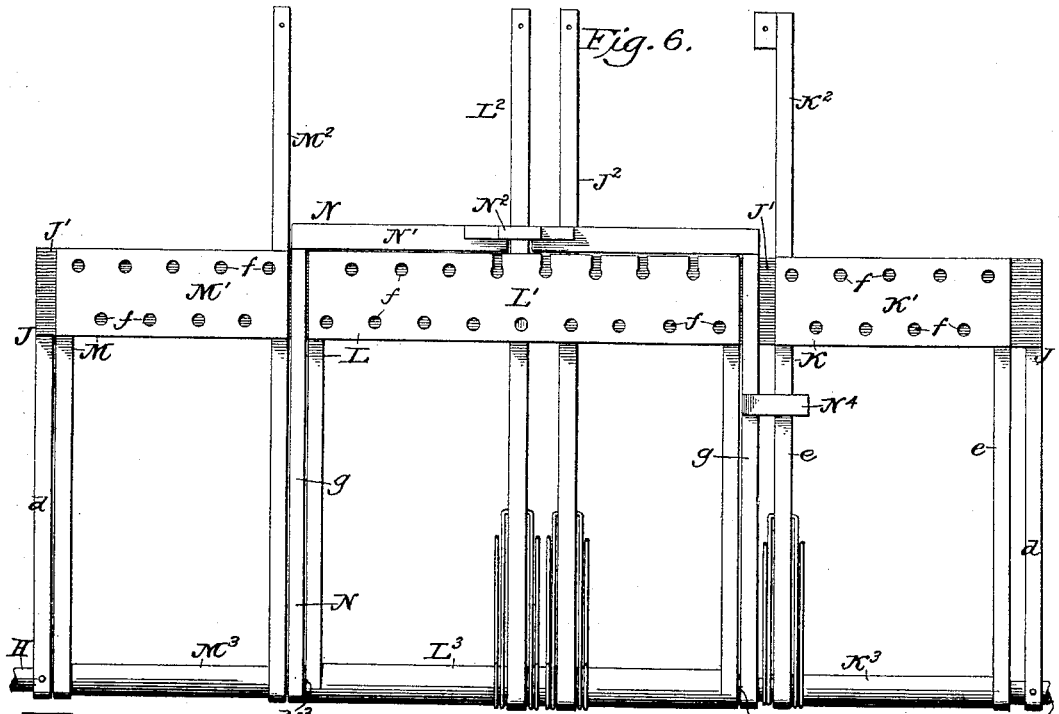
Figure 8:
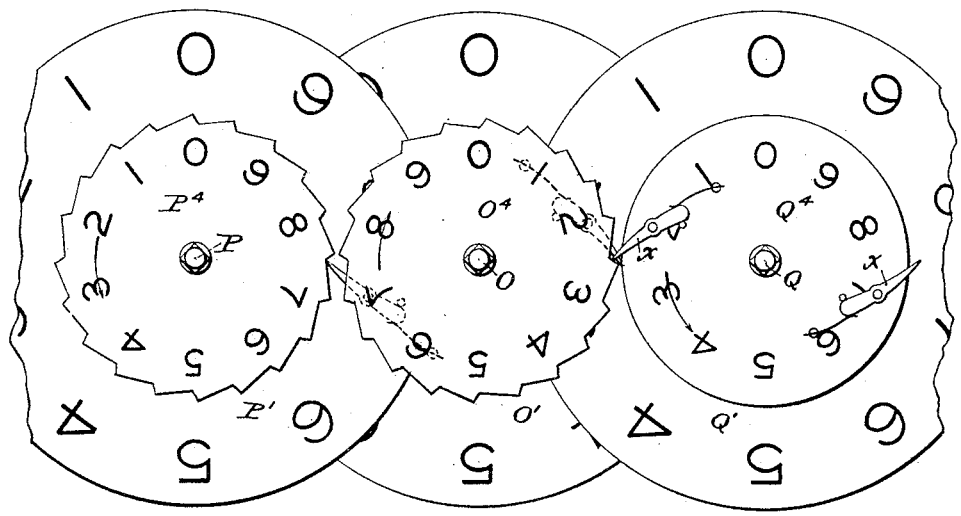
Figure 9:
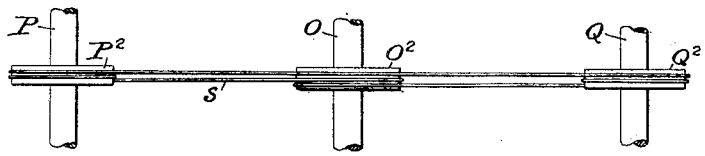
Figure 10:
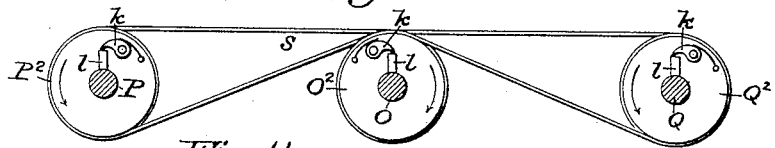
Figure 11:
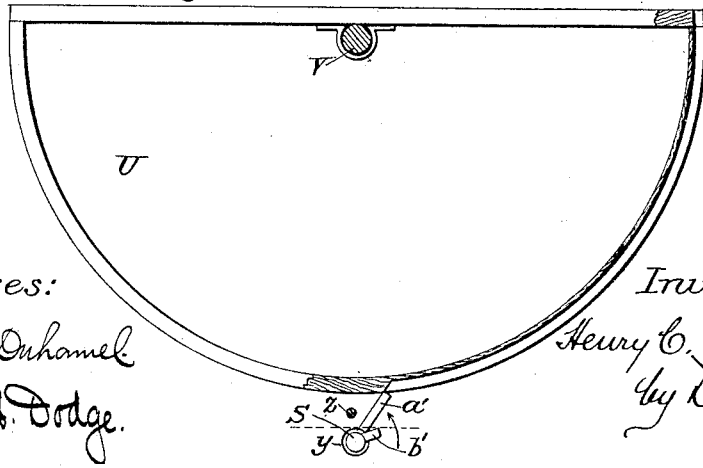
Figure 12:
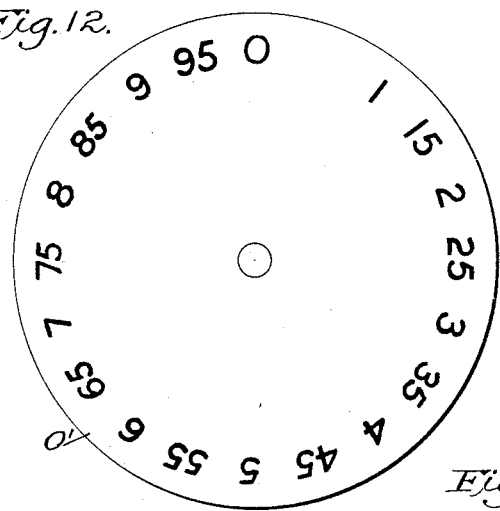
Figure 13:
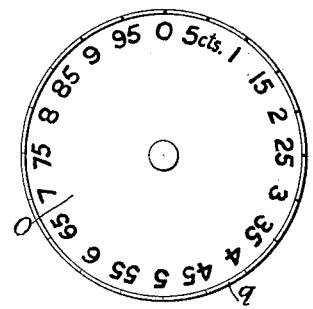
Figure 14:
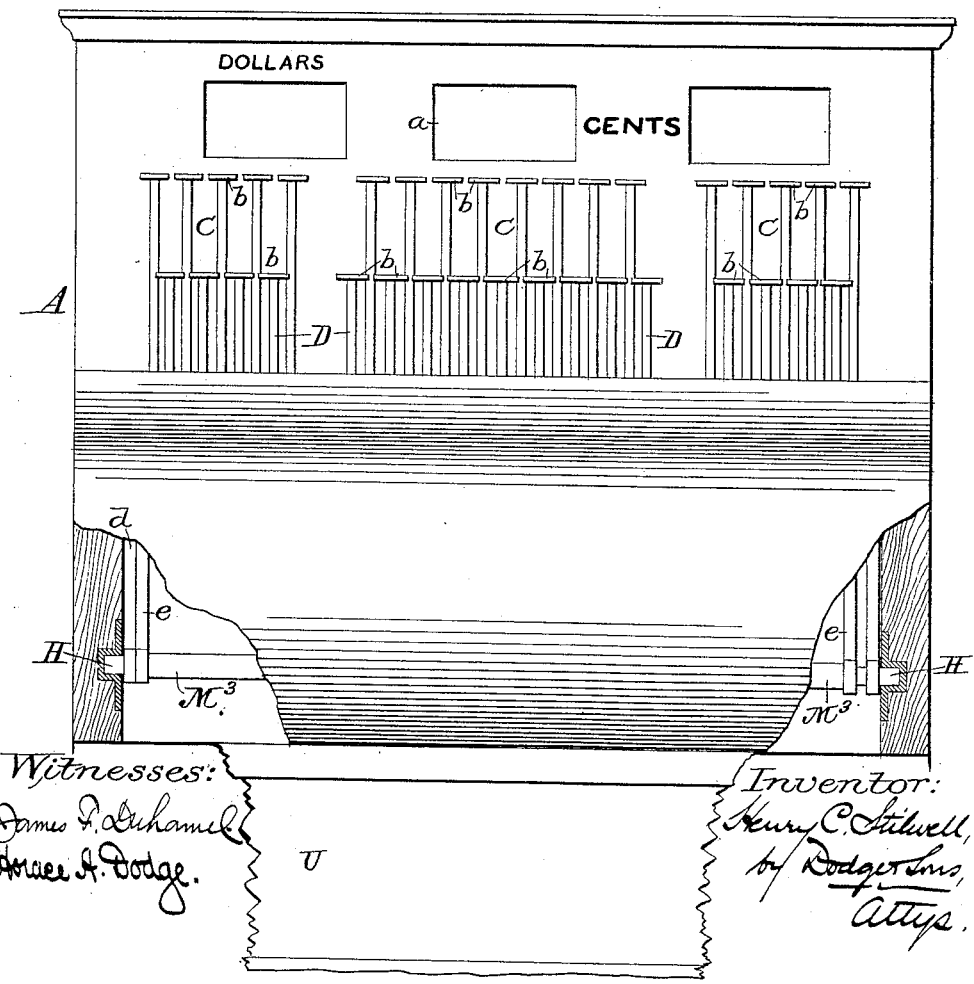

In the drawings, Figure 1 is a vertical sectional view of my improved machine, taken from front to rear; Fig. 2, a perspective view of the mechanism by which the indicating and registering disks are moved or actuated, the parts being separated, broken away, and represented in section wherever necessary to better show their form and relation. Fig. 3 is a face view of the pawl and trip mechanism of one of the disks, portions being broken away to show parts which fall one behind another; Fig. 4, an edge view of one of the band-drums for imparting rotation to the disk-shafts; Fig. 5, a face view of the several groups of actuating-stems; Fig. 6, a plan view of the several frames which are depressed by the keys or stems and through which motion is given to the indicating and recording mechanisms; Fig. 7, a face view of the registering-disks, showing the preferred construction and arrangement of the pawls by which one disk imparts motion to another; Fig. 8, a modification of the same; Figs. 9 and 10, views illustrating the manner of connecting several drums of the indicating and registering mechanisms; Fig. 11, a plan view of the rotating and gravitating till, partially in section; Fig. 12, a face view of the dime-disk of the indicator; Fig. 13, a similar view of the dime-wheel of the register; Fig. 14, a front face view of the complete apparatus; Fig. 15, a plan view of the complete machine with portions of the casing removed or in section.

The mechanism is mounted in a suitable case or cabinet A, which may be constructed of wood or metal, or partially of each, and which is provided with windows or openings $a$, through which to observe and read the indicator. The registering-disks may be similarly exposed; or, as is preferred, a removable cover B may be provided, so that the aggregate record may be inspected when necessary, but shall be at other times concealed.

The indicator and register both consist of a series of disks, each disk bearing figures in regular progression from 0 to 9, the dime-disks of both being further provided under certain circumstances with figures indicating the odd multiples of five from 15 to 95, alternating with the figures first mentioned. The disks are rotated at proper time and to required extent by mechanism which will be described farther on, the indicator-disks assuming each time the position necessary to expose the figures indicating the amount of the latest purchase and the registering-disks advancing each time a distance sufficient to add to the previously-registered sum the amount of the latest purchase.

Referring now to Fig. 1, C and D represent rods or stems provided at their upper ends with finger-buttons or heads $b$, each of which bears a figure or mark to indicate its value in the series, there being three groups of keys C and D, each group comprising an upper and a lower bank or tier, as indicated in Figs. 1 and 5. Of these three groups the keys of the first are arranged to actuate the indicator and register for cents from 1 to 9, those of the second to actuate the indicator and register for even multiples of five and for odd multiples thereof from 15 to 95, and those of the third to actuate the indicator and register for dollars. The stems C and D are held in place and guided in tubes E, Fig. 1, each tube being slotted and encircled by a spiral spring F and each stem being furnished with a laterally-projecting pin or stud, which, extending through the slot of the tube, bears upon the encircling spring, and is thereby raised to and held in an elevated position. Each tube E is seated at its upper and lower ends in recesses formed in the faces of supporting-bars G, extending from end to end of the case or cabinet A parallel with its front. This construction is simple and cheap and insures a smooth and easy movement of the stems, the tubes preventing the collapse or buckling of the springs and guiding the stems throughout the length of the tubes. Each stem C and D is reduced or "necked down" at its lower end, thus forming a shoulder $c$, as shown in Figs. 1, 2, and 5, the shoulders being at different distances from the lower ends of the stems, as indicated in Fig. 5. The difference in location of the shoulders $c$ determines the extent to which the indicating and registering disks shall be turned by the depression of the respective stems, as will appear presently.

H indicates a cylindrical rod or stem passing from one end of the cabinet A to the other, parallel with the front thereof and located near the front and a little above the floor or horizontal partition I, which separates the till-space from that occupied by the mechanism of the apparatus. Upon this rod are mounted five frames, designated, respectively, J, K, L, M, and N. The ends of the rod H are advisably mounted and arranged to turn or rock in boxes or bearings, as shown in Fig. 14, in which event the side bars $d$ of frame J will be pinned or keyed fast to said rod, as indicated in Fig. 6. Frame J comprises the side bars or arms $d\,d$ and a continuous connecting-plate J', of a length and width to pass beneath and to receive the pressure of all the stems C and D of the several groups in the manner illustrated in Figs. 1 and 2. A lever or bar $J^2$ extends from the rod H or from a sleeve encircling the same beneath plate J', to which it is securely attached, and backward to near the rear wall of the cabinet, as shown in Figs. 1, 2, and 6. Under this arrangement it will be seen that the depression of any stem of the entire number will cause a corresponding depression of plate J' and of bar or lever $J^2$. The frame K is of similar construction, but smaller, consisting of two side arms or bars $e\,e$, one of which is extended backward to produce the lever $K^2$, a plate K', connecting said bars, and a sleeve $K^3$, which encircles rod H and forms a rigid connection between the front ends of the side bars to prevent the frame from twisting or springing under pressure near either end of the plate K'. Frames L and M are of essentially the same construction as frame K, having, respectively, plates L' and M' and bars or levers $L^2$ and $M^2$. The plates K', L', and M' are each formed with a series of perforations $f$, of a size to permit the reduced lower ends of the stems C D to pass freely through them, but smaller than the shoulders $c$, which consequently bear upon and depress the respective plates K' L' M' when forced down below the normal levels of said plates. It will thus be seen that if any stem be depressed the long lower plate J' will be forced down, and that as soon as the shoulder $c$ of such stem reaches the face of the upper plate, through which it passes, said upper plate will likewise be depressed. This will be readily understood upon reference to Figs. 1 and 2. It will also be apparent that the relative depression or movement of the upper and lower plates will in each case depend upon the length or distance between the lower extremity of the stem and the shoulder $c$. The frame N consists of two side bars $g$, a connecting cross-bar N', provided at or near its mid-length with a raised yoke $N^2$, and a sleeve $N^3$, connecting the forward ends of the bars $g$ and encircling rod H and in turn encircled by a sleeve $L^3$, which connects the side bars of frame L.

The purpose of constructing the several frames with sleeves to connect the pivotal ends of their side bars is to prevent twisting or irregular depression of the frames, frame N having a sleeve $M^3$ similar to the others. Frame N is formed or provided with a lug $N^4$, which projects laterally from one of its side bars and overlies the side bar of frame K, as shown in Fig. 6, so that when frame N is depressed it shall carry with it the frame K. The frame N is depressed only by the stems D of the upper or rear rank of the middle group or series, which stems are each furnished with a horizontally-projecting pin $h$. As a stem is depressed its pin $h$ bears upon the cross-bar N' of frame N and carries the latter down before it. The dime-frame N, through its lug $N^4$, depresses the cent-frame K, and the shoulder $c$ of the stem depresses frame L, so that the two frames are actuated at each stroke of the odd multiple-keys, or the keys having the pins $h$, and the disks thereby controlled are caused to indicate either jointly or separately, according to the amount, the sum to be represented. The pins $h$ are located at a uniform elevation or at a uniform distance from the lower extremities of the stem D in order to cause the frame N to be depressed to the same distance or level by each.

Located in the upper part of the cabinet and journaled in bearings in the front and rear walls thereof or otherwise conveniently supported are three shafts O, P, and Q, Figs. 1, 8, 9, and 10, parallel with each other and conveniently arranged at equal distances apart, the shaft O at the mid-length of the case or cabinet. Each of said shafts has made fast upon it a notched or fluted wheel $i$, which is lightly held against rotation by a spring detent or brake $j$, the bearing end of which is curved or beveled to permit the wheel $i$ to turn either way beneath it upon the application of slight force, the action of the detent being intended merely to prevent accidental movement of the wheel or undue travel thereof by reason of momentum of the parts. Shaft O carries a disk O', shaft P carries a disk P', and shaft Q carries a disk Q', each secured upon its shaft in such manner as to turn therewith. The other devices carried by the several shafts being precisely alike, except that the pawls, ratchets, &c., of the shafts P and Q are reversed relatively to those of shaft O, I will describe said parts in connection with shaft O, and particularly in connection with Figs. 1, 2, and 3.

$O^2$ indicates a disk or drum loosely encircling shaft O and carrying a spring-pressed pawl or dog, the nose of which, when the several disks stand at zero, overhangs the end of a radial stud or pin $l$, projecting from the shaft O close to the side or face of the disk or drum $O^2$. The nose or free end of the pawl is broadened to a width equal to about twice the diameter of the stud or pin $l$, so as to rest upon or to be raised by a cam-disk $m$ when the disks stand at zero and under certain other conditions that will be explained. The cam-disk is rigidly secured to or may be made integral with a disk or drum $O^3$, loosely encircling shaft O, and is provided with a pin or stud $n$, which projects from its face in a line parallel with the axis of shaft O and into the path or plane of rotation of pin $l$, as shown in Figs. 1, 2, and 3. The disk or drum $O^3$ carries upon its front face a spring-pressed pawl $o$, which drops into engagement with the teeth of a ratchet-wheel $p$, rigidly connected or made integral with a registering-disk $O^4$, which latter is provided with ratchet-teeth $q$, with which engages a spring-detent $r$, Fig. 1.

The same description applies to the parts carried by shafts P and Q, except that the parts carried by shaft O and designated by the letters O', $O^2$, $O^3$, and $O^4$ are designated P', $P^2$, $P^3$, and $P^4$ in connection with shaft P and are designated Q', $Q^2$, $Q^3$, and $Q^4$ in connection with shaft Q. The three drums or disks $O^2$, $P^2$, and $Q^2$ are connected and caused to rotate simultaneously and equally, but in alternately-reverse directions, by a cord or band $s$, wound once about the disk or drum $O^2$ and twice about the drums $P^2$ and $Q^2$ in the manner illustrated in Figs. 9 and 10, the band being made fast to each disk or drum by a tack, staple, or like device, so located as to permit one complete revolution of each disk. From the drum or disk $O^2$ a band or cord $t$, wound twice about said drum and fastened by a tack $u$, as shown in Fig 4, passes downward and about an idler-pulley $v$, conveniently located in an opening in the floor or partition I. One vertical length of the band passes through the rear or movable end of bar or lever $J^2$ of the frame J, upon which the lower ends of all the stems C D bear, as above explained, and knots, buttons, or other devices above and below arm $J^2$ prevent the slipping of the band $t$ through said arm and insure simultaneous and equal movement of one with the other. Obviously the band may be wrapped or wound about the end of lever $J^2$, or made fast thereto in any other convenient manner, though I prefer the arrangement shown.

From the foregoing explanation it will be apparent that upon the depression of any stem or key C or D of the entire number, all of which stems have a like and unvarying range of movement, the plate J' of frame J, and consequently the entire frame and its arm or lever $J^2$, will be carried downward. The movement of each stem or key C and D is such as to cause one complete revolution of disk $O^2$, and consequently of the connected disks $P^2$ and $Q^2$, the first one to the right and the others to the left, with the pawls and ratchets arranged as shown. The arrangement may, however, obviously be reversed. The shoulder C of each stem C and D comes into contact with the top of the plate K', L', or M', as the case may be, through which the reduced portion of the stem passes, and consequently depresses such frame through the remainder of the downward movement of the stem. The arms or levers $K^2$, $L^2$, and $M^2$ of the respective frames K, L, and M each connect with one branch of a cord or band $w$, of which there are three, one passing about each of the disks $O^3$, $P^3$, and $Q^3$, and thence beneath an idler $v$, as shown in Figs. 1 and 2. The connection of the arms or levers $K^2$, $L^2$, and $M^2$ with the cords $w$ is in each case made with that branch necessary to cause a rotation of the drum or disk $O^3$, $P^3$, or $Q^3$ in a reverse direction from that imparted to the companion disk $O^2$, $P^2$, or $Q^2$ by the depression of frame J and lever $J^2$.

Referring now to Figs. 1 and 2, in which the indicating-disk O' and the registering-disk $O^4$ are both represented as standing with zero at the top and in position to be observed, and assuming that one of the keys C be depressed—the stem or key corresponding to twenty cents, or two dimes, for instance—the reduced lower end of the stem will first cause the descent of the frame J, and this will cause the complete revolution of disk or drum $O^2$; but shortly before the completion of the downward movement of the stem its shoulder $c$, coming into contact with plate L' and depressing the frame L and arm or lever $L^2$, causes drum or disk $O^3$ to rotate a short distance in the reverse direction from that of drum or disk $O^2$. In thus turning, the disk $O^3$, carrying with it the cam or eccentric disk $m$, causes the pin $n$ of said disk to bear against pin $l$ of the shaft O and to rotate said shaft far enough to bring the figure "2" to the place previously occupied by the zero-mark or cipher. At the same time the pawl $o$ of disk $O^3$ turns the registering-disk $O^4$ two points and displays the figure "2," both disks being retained in the positions to which they are moved by the respective detents $j$ and $r$. The stem or key being now released, it is elevated by its spring F, and the frames J and L are elevated by springs R, of any convenient form, each drum or disk turning freely backward and the pawls K and O running back over the pin $l$ and the teeth of ratchet $p$, respectively. If the next item be also twenty cents, or two dimes, the same operation is repeated; but as the pin $l$ already stands two points to the left of its vertical position by reason of previous partial rotation of shaft O and disks O' O⁴ the pawl $k$ would come into contact with pin $l$ just before completing its revolution and would return the pin to its vertical position and the disk O' to the zero-point were it not that just at that instant the cam-disk $m$, carried two points to the left, comes into position to raise the pawl $k$ and to cause it to pass over and clear the pin, consequently leaving the pin, the shaft O, and the disk O² unaffected, the movement of disk $m$ and its pin $n$ being only that which previously carried pin $l$ to the same point. The pawl $o$, on the other hand, engages with the teeth of ratchet $p$ from the start, and consequently said ratchet and the connected disk O⁴ will be advanced two points and the figure "4" will be brought to the zero or starting point and displayed. Each higher number following a lower one will simply carry the pin $l$ enough farther to bring to view the proper figure, the eccentric disk $m$ in each such case preventing the pawl $k$ from acting upon and receding the pin $l$ in the manner just explained; but if any number be followed by a lower one the cam-disk will not pass beneath and raise pawl $k$ until after said pawl comes into contact with pin $l$ and turns backward the shaft O and disk O² a greater or less distance, according to the key depressed, and until the pin $l$ is carried into contact with pin $n$ of cam-disk $m$, which latter, throwing out the pawl $k$ and continuing its movement, carries the disk again forward to the required point. In case the figure "1" is to be displayed, after a larger number has been indicated, the two pins $l$ and $n$ will not come into engagement until the pin $l$ has been carried backward by the pawl $k$ almost to the vertical position, the backward movement being proportionate to the difference between succeeding numbers indicated and being greatest when a smaller number follows a larger one, the final movement being in every case forward.

It will be readily understood from the foregoing that upon depressing any stem or key the registering-disk which it controls will be advanced a distance corresponding to the value of the key depressed; but the indicating-disk will be advanced only enough to raise the indication to the value of the key; or if a lesser amount is to be indicated the disk will be first turned backward toward or to zero and then forward to the proper point. All the pins $h$ of the odd-multiple keys D of the middle group are set at such elevation as to carry frame N, and consequently the cent-frame K, down the proper distance to mark five on the cent indicating and registering disks, while the shoulders $c$ of said stems cause the frame L to be depressed and the disks controlled thereby to be turned varying distances, according to the values of the keys. If an odd multiple of five above the first power is to be indicated the appropriate stem or key of the dime group is depressed and the first figure of the amount appears at the dimes-window and the second figure at the cents-window, though to avoid uncertainty in reading the word "cents" is placed between the dimes and cents windows, so that both shall fall within this designation.

Supposing that it be desired to add and indicate a sale amounting to more than nine cents and less than one dollar—say sixty-seven cents—in such case the indication and the registering will be effected by depressing the key or stem C of the dimes group bearing the numeral "6" and immediately thereafter depressing the cents stem or key numbered "7," the amount being then read from the dimes and cents indicator disks jointly.

The foregoing description is based upon the employment of frame N and the joint use of two dials for indicating and two for registering odd multiples of five above the first power; but I propose in some cases to dispense with the frame N and the pins $h$ and to indicate and add the odd multiples of five above the first power upon the dimes-disk. This I accomplish by alternating with the numerals 0 to 9 on said disks the odd numerals of five above the first power and arranging the keys or stems D of the dimes group to move said disks to the intermediate numbers thus provided.

The ratchet-wheels of the dime indicating and registering mechanism have twenty teeth each, and the cents-adding disk is furnished with two pawls $x$ $x$ on diametrically-opposite sides of the disk, as shown in Figs. 7 and 8, in which figures the dimes-disk is likewise represented as bearing two pawls similarly arranged. As to the latter disk, however, this is not necessary, as a single pawl of proper length arranged to act successively upon twenty teeth or abutments upon the dollars-disk will answer as well.

The purpose of using two pawls and twenty teeth on the cents and dimes disks is to permit the dimes-wheel to register the odd multiples of five above the first power by the numbers intermediate of the numerals 0 to 9 instead of adding them by the two disks acting in conjunction. The pawls are preferably made and applied in the manner illustrated in Fig. 7—that is to say, to swing perpendicularly to the face of the disk—in order that when a disk is turned and one of its teeth is carried beneath the pawl the latter may drop squarely and closely in behind the rear or abrupt face of the tooth and not have room for play or backward movement of the disk. The same end may be attained, however, by curving the rear faces of the teeth on the arc of a circle having a radius equal to the length of the pawl measured from its pivot to the nose or bearing-point. The pawls are pivoted in either case to permit the advance of a disk of higher denomination when the pawl is engaged with its teeth without carrying forward the disk to which the pawl is pivoted.

It is sometimes desirable to indicate and register successively several items of one purchaser, so that the aggregate sum shall appear upon the indicator. To accomplish this result I provide a locking device S to engage and hold the plate J² of the universal frame J when the latter is depressed, so that none of the disks shall be carried backward until said plate is released, which will be after the several items are recorded and indicated. The locking device S is represented in Figs. 1 and 11, and consists of a vertical stem or post of cylindrical form mounted in a suitable hole in the floor I and arranged to rotate about its vertical axis to a limited distance. A spring $y$, wound about the stem and having its ends respectively made fast to the stem and to the floor, serves to turn the stem in the direction indicated by arrow in Figs. 1 and 11 as far as permitted by the stop $z$. A radial arm $a'$ below the floor or partition I is normally pressed inward against the till and away from stop $z$, or so long as the till remains closed and within the cabinet; but the till is so arranged that when the plate J' is depressed said till is immediately released and moves outward, as presently explained, and in thus moving outward frees the arm $a'$ and permits the vertical stem to turn and thereby to carry a shorter arm $b'$ over the edge of the depressed plate J', thus holding said plate against rise. The various keys or stems may then be actuated and all the disks rotated constantly forward to any extent required, the drums or disks O², P², and Q² being inoperative to effect a retrograde movement of the indicating-disks.

It remains only to explain the construction and arrangement of the till or money-receptacle and the devices for locking and releasing it, and these features will also be found illustrated in Figs. 1 and 11.

U indicates the till, which is made of semicircular form and arranged to rotate and to move vertically about a cylindrical stem or support V at the front of the case or cabinet A. Partially encircling the stem V is an inclined way or bearing $c'$, upon which rests and travels an anti-friction roller $d'$, carried by the till. Beneath the front wall of the till is a hinged strip or bar $e'$, which when the till is closed is thrown upward and inward beneath the till to the position shown in Fig. 1 by a spring $f'$, thereby closing the space between the till. When the till is released, its weight, supported by the roller upon the incline, causes said roller to descend the incline and thereby to turn or swing the till outward, a pin or lug $g'$ on the lower side of the till striking the strip or bar $e'$ and throwing it outward from beneath the till, so as not to impede the movement of the latter. To permit the locking device S to enter into engagement with plate J' promptly upon the release of the till, the inner face of the till may be grooved, as shown in Fig. 11, or a rib or projection may be made upon said face, which shall ride from against arm $a'$ immediately upon commencement of movement by the till. A gravitating elbow-lever W, pivoted in a suitable block and having its beveled lower end arranged to drop through a hole in the floor or partition I, serves as a latch or lock for the till when the latter is closed, but is raised out of engagement with the till by the depression of the first key and the consequent depression of the plate J' of the universal frame J.

It is manifest that the details may be considerably varied. Thus the guiding-tubes for the stems may be omitted, chains and sprocket-wheels may be substituted for the drums and cords or bands, and other forms of latch or fastening for the till may be used.

Obviously the indicator-disks may be numbered on both faces and windows provided through which to read from both, the figures on one face running in a reverse order from those on the other—that is, to the right and the left, respectively. The yoke N² permits frame N to descend to any required point without colliding with arm or lever L².

In practice I have found a hard-twisted linen cord or band, such as is used for fishing-lines, and coated or impregnated with a preparation adapted to exclude moisture, answers well for the bands $t$ and $w$, and silk is also suitable.

It is desirable, in order to avoid inaccuracy of movement of the dials, to use a cord or band not liable to lengthen or shorten under varying atmospheric conditions.

The purpose of reversing the pawls, ratchets, &c., of the several disks alternately is to permit each adding-disk to directly actuate the next, and thus to dispense with intermediate gear.

It is of course obvious that the register-train may be added to any desired extent. It is likewise apparent that the pawl and ratchet of the drum and disk may be reversed, the pawl being placed upon the disk and the ratchet upon the drum, and such mere reversal is of course comprehended within my invention and claims.

The locking device S renders it unnecessary to maintain the pressure upon each key where several are depressed in indicating a given sum, and it permits the operator to depress in succession several keys and set several indicators without difficulty—as, for instance, a dollars-key, a dimes-key, and a cents-key, and their corresponding indicators.

I do not broadly claim a rotary till; nor do I claim a till which closes by rotation due to the action of gravity.

Having thus described my invention, I claim—

1. In a cash indicator and register, the combination of a series of shafts, indicating-disks and registering-disks carried by said shafts, drums loosely mounted upon the shafts and adapted to be rotated in both directions, a pawl carried by one of said drums and serving to advance the registering-disk, a pawl carried by the other of said drums and serving to turn the indicating-disk backward, and a cam carried by the first of said drums and serving to control the action of the pawl of the other drum, substantially as described.

2. The combination, in a cash indicator and register, of a shaft O, provided with a pin $l$, an indicator-disk O', carried by said shaft, a drum $O^2$, loosely mounted upon shaft O and provided with a pawl $k$, a second drum $O^3$, provided with cam-disk $m$, pin $n$, and pawl $o$, disk $O^4$, provided with ratchet-wheel $p$, band $t$, passing about drum $O^2$, band $w$, passing about drum $O^3$, lever $J^2$, connected with band $t$, lever $L^2$, connected with the band $w$, and a stem or key adapted to operate first one and then the other of said levers.

3. In a cash indicator and register, the combination, with suitable indicating and registering disks, of drums provided with pawls to give motion to said disks, bands passing about said drums, movable frames provided with arms or levers connecting with the respective bands and each bearing a plate, and a shouldered stem, the reduced lower end of which passes through an opening in the upper plate and bears at its lower end upon the lower plate, substantially as shown and described, whereby upon the depression of the stem one drum is rotated in one direction and when the shoulder of the stem reaches the upper plate the other drum is rotated in the opposite direction.

4. In combination with a shaft having an indicating-disk rigidly secured thereto and with a pin projecting from the shaft, a drum loosely mounted upon the shaft and provided with a pawl to engage said pin, and a cam or eccentric also loosely mounted upon the shaft and capable of rotation independently thereof and of the drum and serving to control the engagement of the pawl with the pin.

5. In combination with a shaft having a pin or stud and provided with an indicating-disk, two drums mounted loosely upon the shaft and capable of independent rotation in opposite directions, a pawl or dog carried by one of said drums and serving to engage the pin or stud of the shaft, a cam or eccentric carried by the other drum and serving to control the action of the pawl, and a pin carried by the cam or eccentric and serving to act upon the stud or pin of the shaft.

6. In combination with shaft O, provided with pin $l$, disk O', and notched wheel $i$, detent $j$, bearing upon said wheel, drum $O^2$, provided with pawl $k$, drum $O^3$, provided with pawl $o$, cam or eccentric $m$, and pin $n$, disk $O^4$, provided with ratchet-wheel $p$, and actuating devices, substantially such as described and shown, for imparting rotary motion to the two drums.

7. In a cash-indicator, the combination, with the indicating devices, of a frame provided with an imperforate plate, a second frame provide with a perforate plate overlying the imperforate plate, both frames connected with the actuating or controlling devices of the indicator, and a shouldered stem, one or more, the reduced end of which passes through the perforated plate and bears upon the imperforate plate, whereby the longitudinal movement of the stem is caused to produce first a movement of one plate and then a movement of the other.

8. In a cash-indicator, the combination, with suitable indicating devices, of an actuating and controlling mechanism therefor, consisting of a series of stems C D, having shoulders $c$ at varying distances from their inner ends, a frame J, having an imperforate plate J' passing beneath all the stems, and a second frame, as K, above the first, provided with a perforate plate, as K', through which the reduced ends of the stems pass, whereby each stem is caused, when depressed, to first depress the plate J' and then to depress the plate K', the relative times and movements of the plates being determined by the distance between the end and shoulder of the actuating-stem.

9. In combination with indicating devices substantially such as described and shown, actuating and controlling mechanism consisting of a universal frame J, having a continuous imperforate plate J', a cents-frame K, a dimes-frame L, and a dollars-frame M, provided, respectively, with perforate plates K', L', and M', and shouldered keys or stems having their reduced ends passed through the perforated plates and bearing upon the imperforate plate, substantially as shown and described.

10. In a cash-indicator, the combination, with the dimes and cents indicators, of a controlling-frame K for effecting and determining the movements of the cents-indicator, a coupling-frame independent of but adapted to engage with the cents-frame, a controlling-frame for effecting and determining the movements of the dimes-indicator, and a series of stems for depressing dimes and cents frames, the dimes-keys representing odd multiples of five above the first power being provided with pins or projections to engage the independent coupling-frame and to cause it to depress the cents-frame, substantially as and for the purpose explained.

11. In a cash-indicator, the combination, with indicating devices, of a perforated plate for actuating or controlling said devices, and a series of shouldered stems or keys, each having its reduced end passed through one of the perforations of the plate, the shoulders of the respective stems being at varying distances from the plate, substantially as set forth, whereby like movements of the several stems are caused to move the plate and the parts connected therewith varying distances.

12. In combination with suitable indicating devices and with the movable frames J, K, and L for actuating and controlling said devices, coupling-frame N for causing the frames K and L to act in unison.

13. In combination with indicating devices substantially such as shown and with the movable frames J, K, and L for actuating and controlling said devices, a coupling-frame N for causing the frames K and L to act in unison, and a stem D, provided with a shoulder $c$ and a pin or projection $h$, serving, respectively, to bear upon the frames L and N.

14. In combination with indicating devices and with the actuating-frames J, K, and L, provided, respectively, with arms or levers $J^2$, $K^2$, and $L^2$, coupling-frame N, provided with yoke $N^2$ to permit the frame N to descend to the proper distance without colliding with lever $L^2$.

15. In combination with devices for indicating individual sums or purchases and with the frame J for actuating and controlling said devices, a series of stems or keys, each adapted to depress said frame J, and a locking device, as S, adapted to engage and hold said frame in a depressed position when depressed by any key of the series and to hold the same during the depression of other keys, substantially as and for the purpose explained.

16. In combination with indicating devices and with a frame J, connected with and participating in the actuation and control thereof, a series of stems, each adapted to depress said frame, a locking device, as S, adapted to engage with and hold frame J when the latter is depressed, and a till arranged to press against and throw back the locking device in the act of closing the till, whereby the plate is engaged and held upon the depression of the first key and remains thus held during the repeated depression of said key or depression of any other key until the till is closed.

17. In combination with indicating devices and with frame J, connected therewith, a locking device consisting of a rotary stem provided with arms $a'$ $b'$ and with spring $y$, and a till U, arranged to bear against arm $a'$ when closed and to partially rotate the stem against the force of the spring.

18. In combination with case or cabinet A, pivoted till U, adapted to automatically turn and swing outward from within the case or cabinet by gravity when released.

19. In combination with case or cabinet A, a till U, having a vertical pivot, an inclined track or bearing partially encircling said pivot, and an anti-friction roller bearing the weight of the till and resting upon the inclined track or bearing, substantially as shown and described.

20. In combination with case or cabinet A and a till U, having an upright pivot and inclined track or way $c'$, a supporting-roller $d'$, bearing upon said track, and a hinged bar or strip $e'$, extending along the front of the case or cabinet below the till and serving when the till is closed to fill the space beneath the same, substantially as set forth.

21. In combination with a case or cabinet, a till U, having a vertical pivot or axis and adapted to automatically swing outward from within the case or cabinet by gravity when released, and a catch or fastening to engage and hold said till when closed, substantially as set forth.

22. In combination with suitable indicating and registering devices and with a swinging frame J, connected with and participating in the actuation and control thereof, a series of stems or keys, each arranged to bear upon and to depress said frame, a till U, and a latch or fastening device W, adapted to engage and lock the till, said latch being located in the path of frame J, substantially as shown, so that the depression of any key shall cause the depression of the frame and the release of the till.

23. In a cash-indicator, the combination of a disk or dial bearing numerals from 0 to 9 and having alternated therewith the odd multiples of five above the first power, a second disk bearing numerals from 0 to 9, and suitable connecting devices whereby the second disk is adapted to indicate alone sums from one cent to nine, the first disk is adapted to indicate the odd multiples of five above the first power, and the two disks are adapted to jointly indicate sums from 1 to 99.

In witness whereof I hereunto set my hand in the presence of two witnesses.

HENRY C. STILWELL.

Witnesses:
CHARLES S. MARSTON,
E. H. CRANDELL.